United States Patent
Chung et al.

(10) Patent No.: US 8,166,613 B2
(45) Date of Patent: May 1, 2012

(54) LIMITING HINGE

(75) Inventors: Chia-Ko Chung, Shulin (TW); Cheng-Syue Wu, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 429 days.

(21) Appl. No.: 12/583,035

(22) Filed: Aug. 13, 2009

(65) Prior Publication Data

US 2011/0035904 A1 Feb. 17, 2011

(51) Int. Cl.
*E05D 11/10* (2006.01)
(52) U.S. Cl. .................. 16/330; 16/303; 16/334; 16/340
(58) Field of Classification Search .................... 16/330, 16/303, 334, 297, 337–340, 374, 387, 342; 455/575.3; 361/679.27; 379/433.13
See application file for complete search history.

(56) References Cited

U.S. PATENT DOCUMENTS

| | | | | | |
|---|---|---|---|---|---|
| 6,154,925 | A * | 12/2000 | Miura | .............................. | 16/338 |
| 7,533,446 | B1 * | 5/2009 | Lin | .................................. | 16/330 |
| 7,603,747 | B2 * | 10/2009 | Ho et al. | .......................... | 16/330 |
| 7,870,644 | B2 * | 1/2011 | Chang | .............................. | 16/337 |
| 7,987,556 | B2 * | 8/2011 | Chang | .............................. | 16/330 |
| 7,992,255 | B2 * | 8/2011 | Chang | .............................. | 16/337 |
| 8,020,255 | B2 * | 9/2011 | Shen | ................................ | 16/340 |
| 2009/0320243 | A1 * | 12/2009 | Wang et al. | ..................... | 16/303 |
| 2010/0031474 | A1 * | 2/2010 | Chang | .............................. | 16/386 |
| 2010/0269296 | A1 * | 10/2010 | Lin | .................................. | 16/342 |
| 2010/0299875 | A1 * | 12/2010 | Shen | ................................ | 16/297 |
| 2011/0154615 | A1 * | 6/2011 | Shen | ................................ | 16/331 |
| 2011/0232035 | A1 * | 9/2011 | Huang et al. | .................... | 16/303 |

* cited by examiner

*Primary Examiner* — William L. Miller
(74) *Attorney, Agent, or Firm* — William E. Pelton, Esq.; Cooper & Dunham LLP

(57) ABSTRACT

A limiting hinge has a stationary limiting washer, a rotating limiting washer, a rotating bracket and a positioning washer mounted around a pintle in sequence. A first resistance is formed between the stationary limiting washer and the rotating limiting washer. A second resistance is formed between the rotating limiting washer and the rotating bracket. A third resistance is formed between the rotating bracket and the positioning washer. Because the first resistance is larger than the second resistance while the second resistance is larger than the third resistance, the rotating limiting washer disengages from the rotating bracket when a huge force is accidentally applied. Therefore, the rotating limiting washer stays still with the stationary limiting washer to prevent breakage.

9 Claims, 11 Drawing Sheets

LIMITING HINGE

BACKGROUND OF THE INVENTION

1. Field of the Invention

The present invention relates to a limiting hinge, especially to a limiting hinge that is mounted between a cover and a base of a portable electronic device.

2. Description of the Prior Arts

A conventional hinge is mounted between a cover and a base of a portable electronic device. To keep the cover of the portable electronic device from over turning, the conventional hinge comprises two cooperating limiting washers to limit the rotating angle of the cover. However, when the cover is overturned by accidental application of a large force, the limiting washers may be broken while the cover and the inside circuit remain unbroken. The limiting washers cannot provide limiting function once broken so the conventional hinge may have to be repaired and is not convenient for use.

To overcome the shortcomings, the present invention provides a limiting hinge to mitigate or obviate the aforementioned problems.

SUMMARY OF THE INVENTION

The main objective of the present invention is to provide a limiting hinge having a stationary limiting washer, a rotating limiting washer, a rotating bracket and a positioning washer mounted around a pintle in sequence. A first resistance is formed between the stationary limiting washer and the rotating limiting washer. A second resistance is formed between the rotating limiting washer and the rotating bracket. A third resistance is formed between the rotating bracket and the positioning washer. Because the first resistance is larger than the second resistance while the second resistance is larger than the third resistance, the rotating limiting washer disengages from the rotating bracket in advance when a large force is accidentally applied and the rotating limiting washer remains with the stationary limiting washer to prevent breakage.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
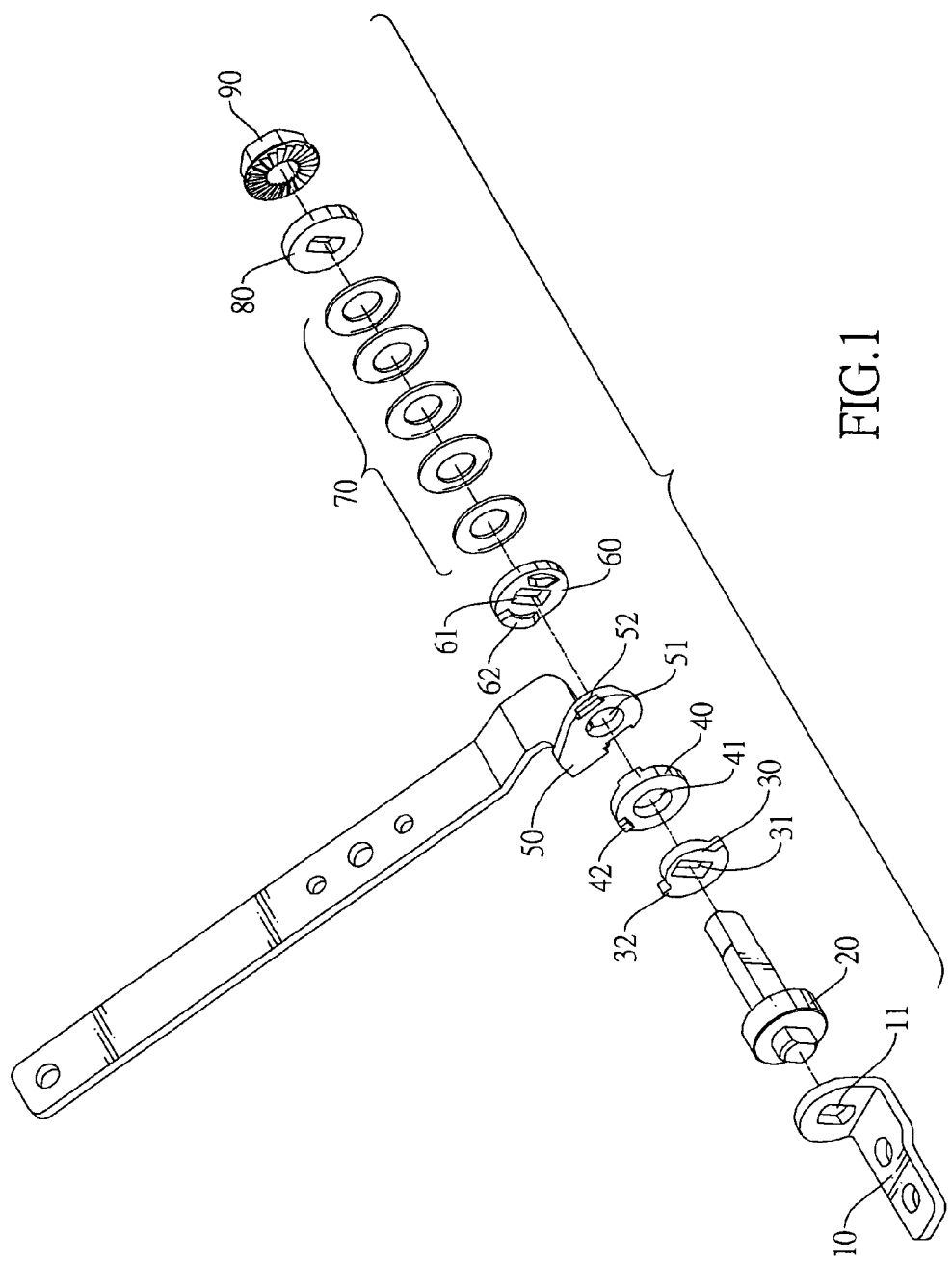
FIG. 1 is an exploded perspective view of a limiting hinge in accordance with the present invention.
Figure 2:
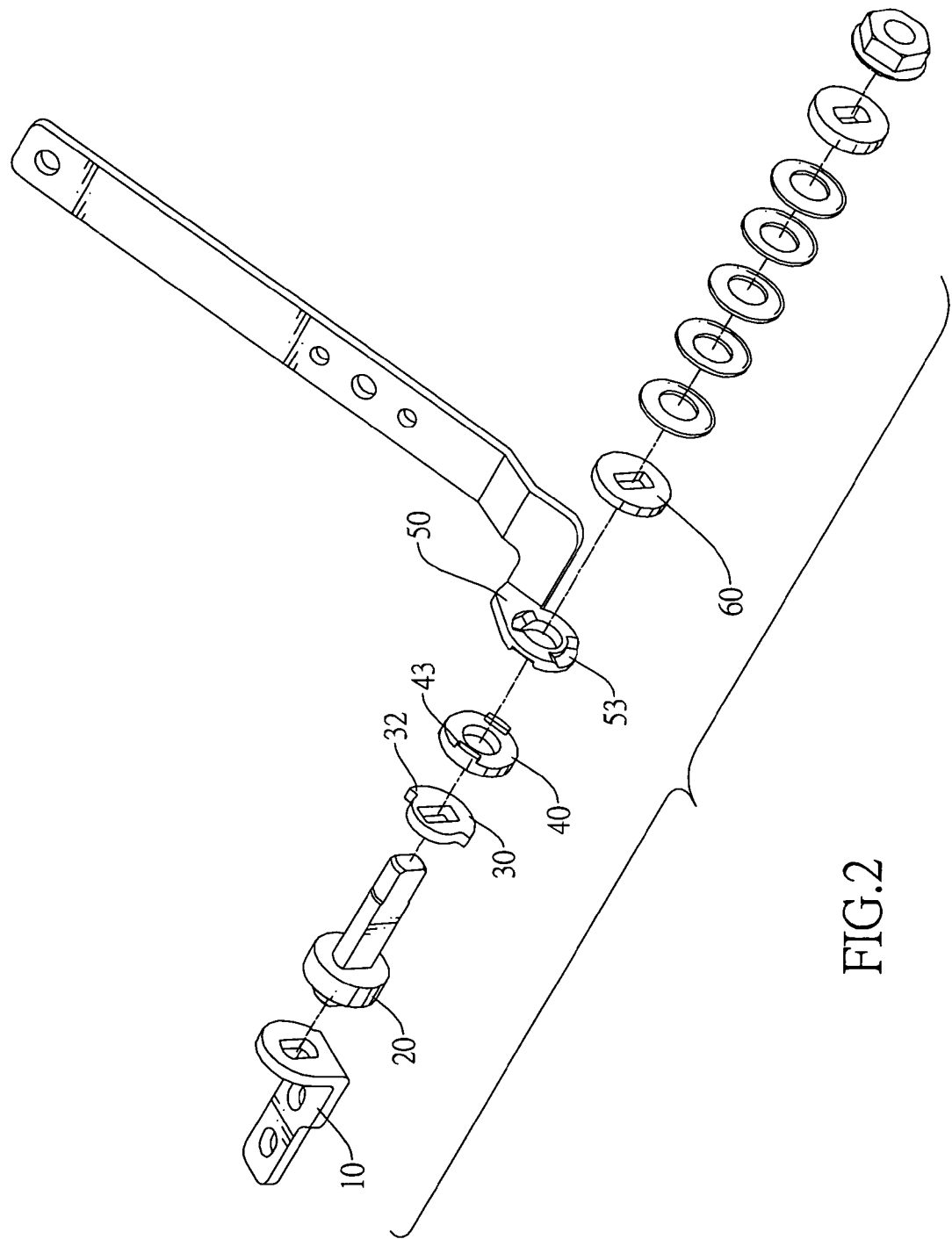
FIG. 2 is another exploded perspective view of the limiting hinge in FIG. 1.

With reference to FIGS. 1 and 2, a limiting hinge in accordance with the present invention comprises a stationary bracket (10), a pintle (20), a stationary limiting washer (30), a rotating limiting washer (40), a rotating bracket (50), a positioning washer (60), a resilient element (70), an additional washer (80) and a fastener (90).

The stationary bracket (10) has a non-circular through hole (11).

The pintle (20) is attached securely to the stationary bracket (10) and may be non-circular in cross section. The non-circular pintle (20) engages the non-circular through hole (11) of the stationary bracket (10) to mount the pintle (20) securely through the stationary bracket (10).

The stationary limiting washer (30) is mounted securely around the pintle (20) via a non-circular through hole (31) and has an arced limiting flange (32). The limiting flange (32) is formed transversely on and protrudes from an annular edge of the stationary limiting washer (30) and has two ends and a longitudinal length $L_1$.

The rotating limiting washer (40) is mounted rotatably around the pintle (20) via a circular hole (41), is adjacent to the stationary limiting washer (30) and has a limit (42) and two bosses (43). The limit (42) is formed longitudinally on and protrudes from a first side of the rotating limiting washer (40) and selectively abuts the ends of the limiting flange (32) of the stationary limiting washer (30). Abutment between the limit (42) and the limiting flange (32) forms a first resistance $F_1$. The bosses (43) are formed longitudinally on and protrude from a second side of the rotating limiting washer (40). Each boss (43) has a longitudinal length $L_2$ and two straight ends.

The rotating bracket (50) is mounted rotatably around the pintle (20) via a circular hole (51), is adjacent to the second side of the rotating limiting washer (40) and has two recesses (52) and two detents (53). The recesses (52) are formed longitudinally in a first side of the rotating bracket (50) and selectively engage the bosses (43) of the rotating limiting washer (40). Engagement between the recesses (52) and the bosses (43) forms a second resistance $F_2$. The detents (53) are formed longitudinally in a second side of the rotating bracket (50). Each detent (53) has two inclined ends.

The positioning washer (60) is mounted slidably around and is rotated simultaneously with the pintle (20) via a non-circular through hole (61), is adjacent to second side of the rotating bracket (50) and has two protrusions (62). The protrusions (62) are formed longitudinally on and protrude from a first side of the positioning washer (60) and selectively engage the detents (53) of the rotating bracket (50). Each protrusion (62) has two inclined ends and a longitudinal length $L_3$. The relationship between the lengths is $L_3 > L_2 > L_1$. The engagement between the protrusions (62) and the detents (53) forms a third resistance $F_3$.

The resilient element (70) is mounted around the pintle (20) and abuts the positioning washer (60) to allow the positioning washer (60) to slide. The resilient element (70) may be a spring or may comprise multiple resilient washers.

The fastener (90) is mounted securely around an end of the pintle (20). The fastener (90) may be screwed on or riveted on the end of the pintle (20). The additional washer (80) is mounted around the pintle (20) and is mounted between the resilient element (70) and the fastener (90) to prevent the fastener (90) departing from the pintle (20).

Because $L_1$ is larger than $L_2$, disengaging the bosses (43) from the recesses (52) is easier than breaking the limit (42) and limiting flange (32). Therefore, $F_1$ is larger than $F_2$. Furthermore, because $L_2$ is larger than $L_3$ and each boss (43) has straight ends while each detent (53) and each protrusion (62) has inclined ends, disengaging the protrusions (62) from the detents (53) is easier than disengaging the bosses (43) from the recesses (52). Therefore, $F_2$ is larger than $F_3$.

The limiting hinge as described is mounted between a cover and a base of a portable electronic device. The stationary bracket (10) is attached securely to the base while the rotating bracket (50) is attached securely to the cover. When the cover is pivoted relative to the base, the rotating bracket (50) and the rotating limiting washer (40) are rotated relative to the stationary limiting washer (30) and the positioning washer (60).

Figure 3:
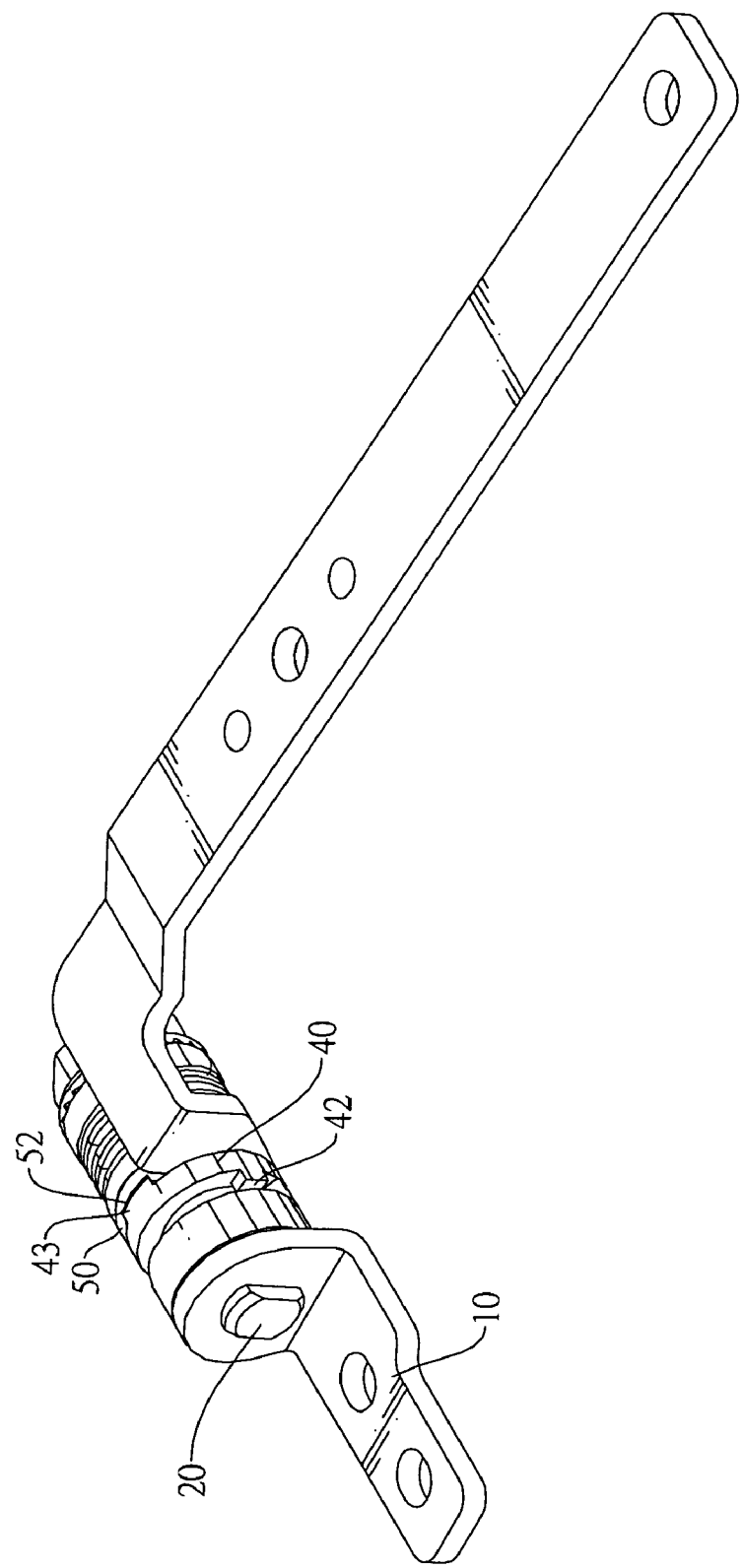
FIG. 3 is an operational perspective view of the limiting hinge in FIG. 1, shown closed.
Figure 4:
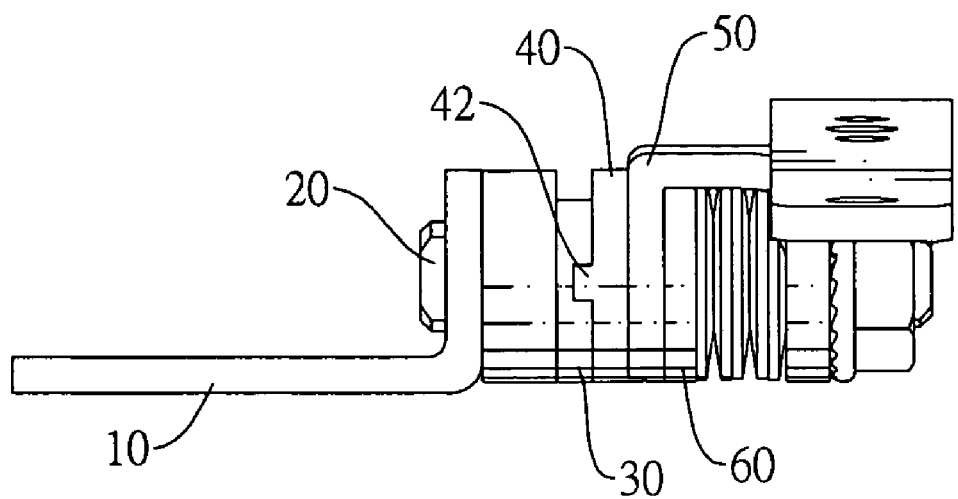
FIG. 4 is an operational side view of the limiting hinge in FIG. 1, shown closed.
Figure 5:
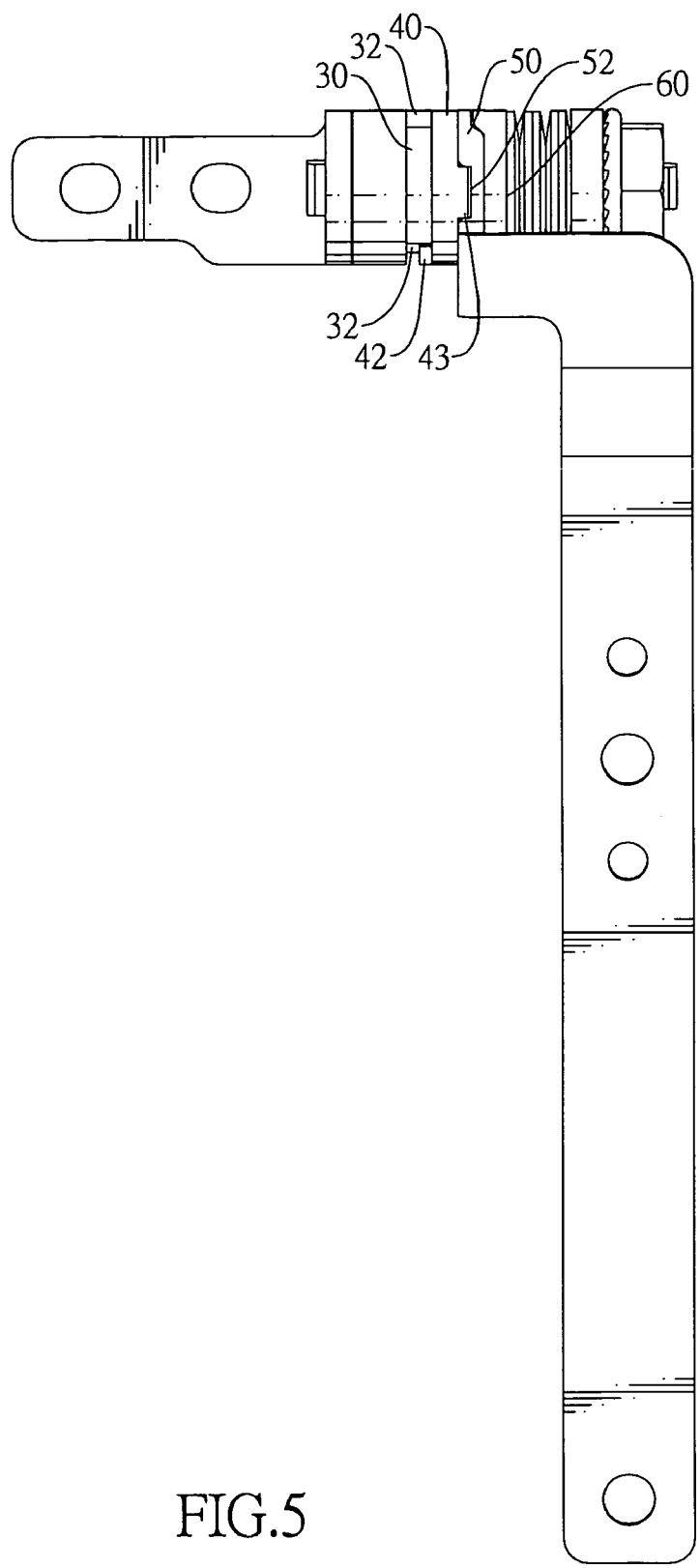
FIG. 5 is an operational top view of the limiting hinge in FIG. 1, shown closed.

With reference to FIGS. 3 to 5, when the cover is closed relative to the base, the protrusions (62) engage the detents (53). The third resistance $F_3$ between the rotating bracket (50) and the positioning washer (60) holds the cover in position.

Figure 6:
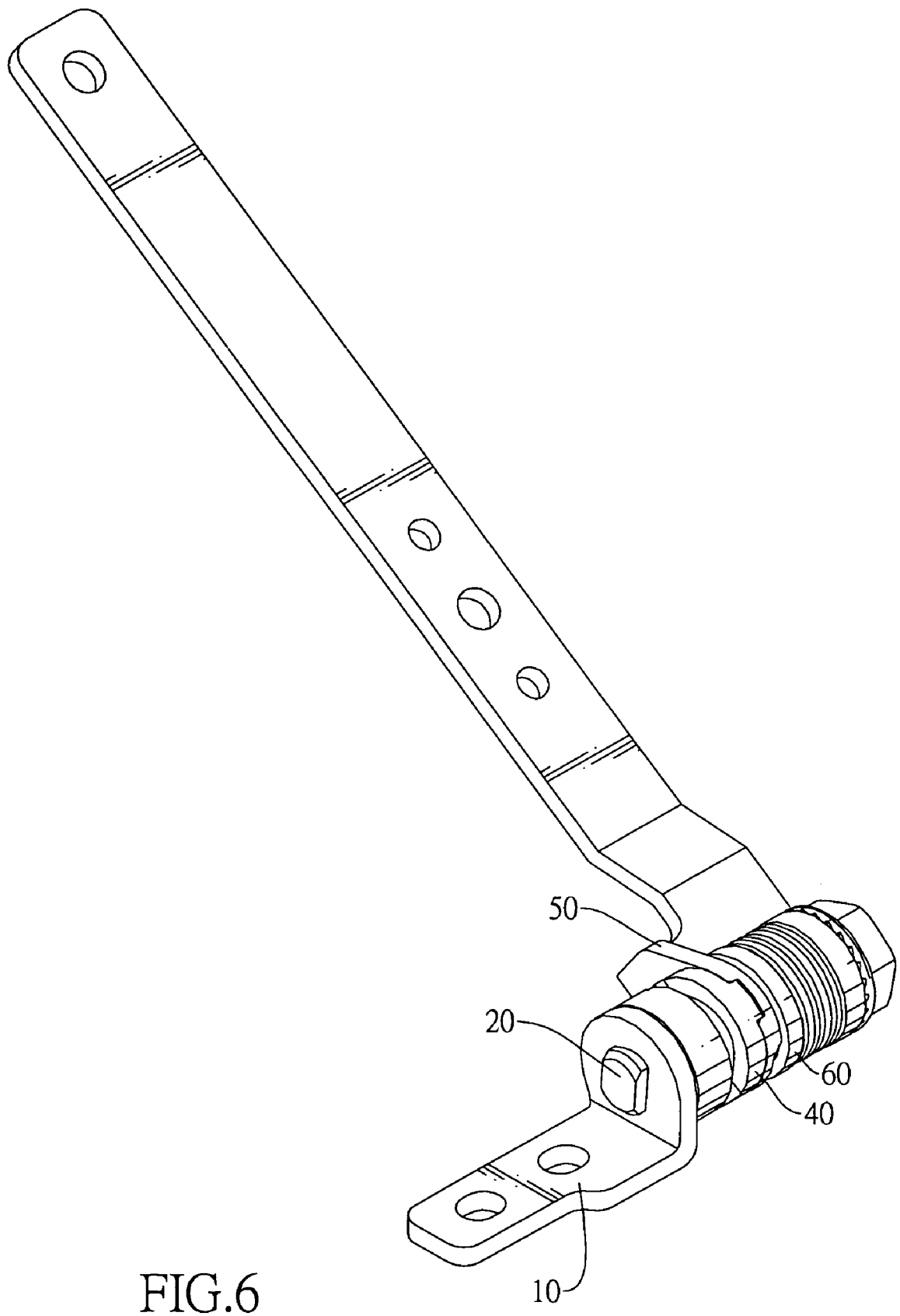
FIG. 6 is an operational perspective view of the limiting hinge in FIG. 1, shown opened.
Figure 7:
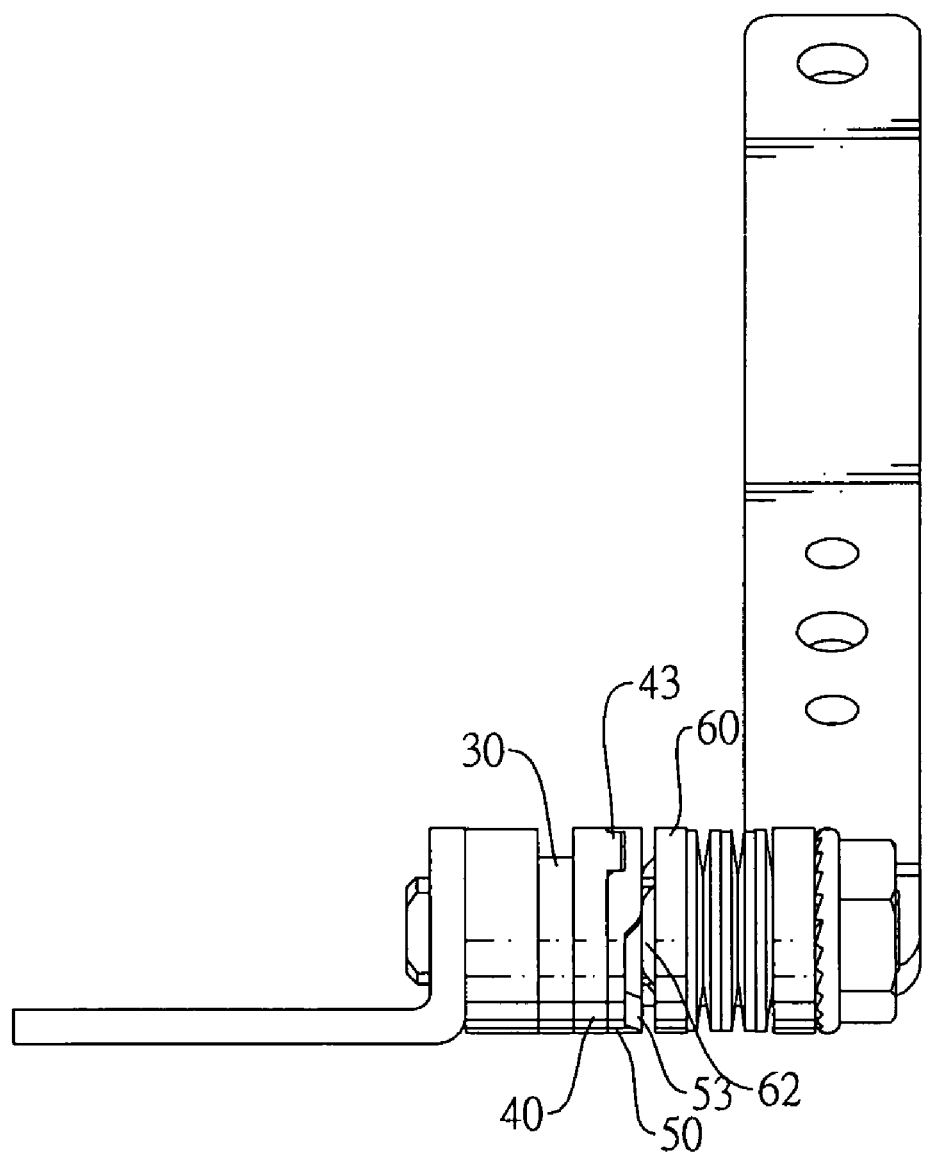
FIG. 7 is an operational side view of the limiting hinge in FIG. 1, shown opened.
Figure 8:
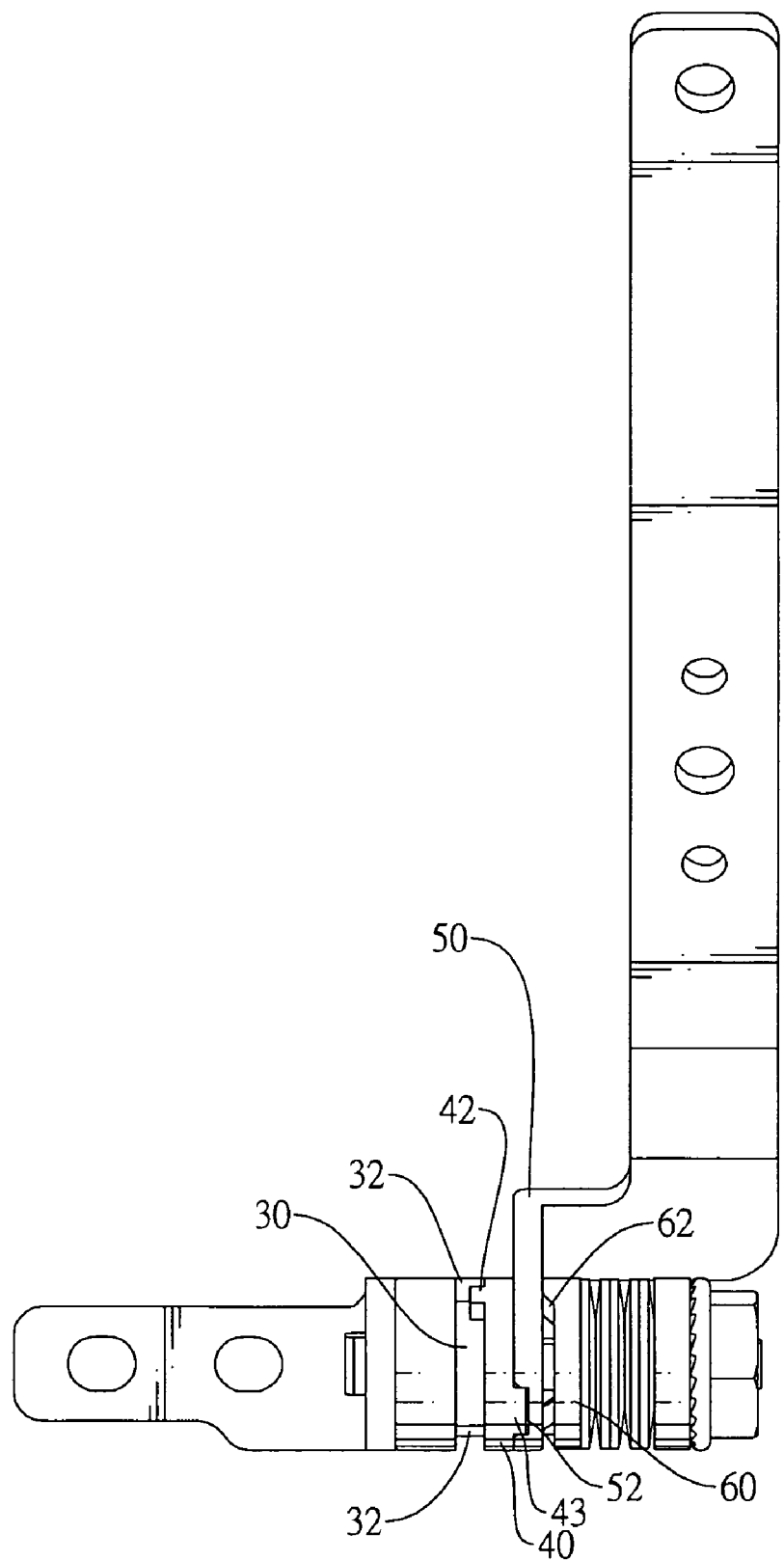
FIG. 8 is an operational top view of the limiting hinge in FIG. 1, shown opened.

With reference to FIGS. 6 to 8, when the cover is opened relative to the base, the user provides torque to resist the third resistance $F_3$. Therefore, the detents (53) are disengaged from the protrusions (62). Since the bosses (43) still engage the recesses (52), the rotating limiting washer (40) is rotated with the rotating bracket (50). When the limit (42) abuts the end of the limiting flange (32), the first resistance $F_1$ stops the rotating limiting washer (40) from rotating. Therefore, the rotating angle of the cover is limited to prevent over-rotation.

Figure 9:
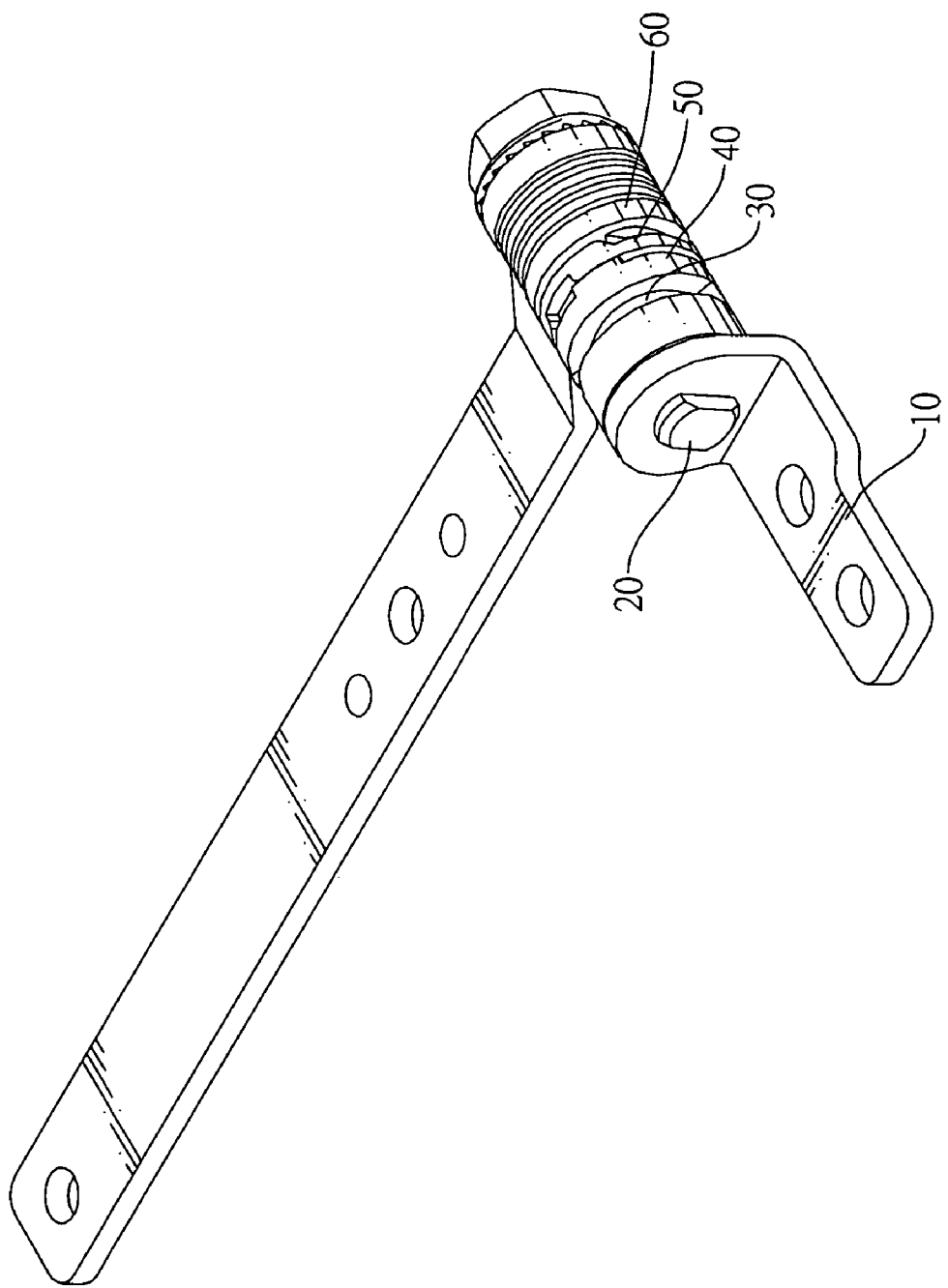
FIG. 9 is an operational perspective view of the limiting hinge in FIG. 1, shown turned.
Figure 10:
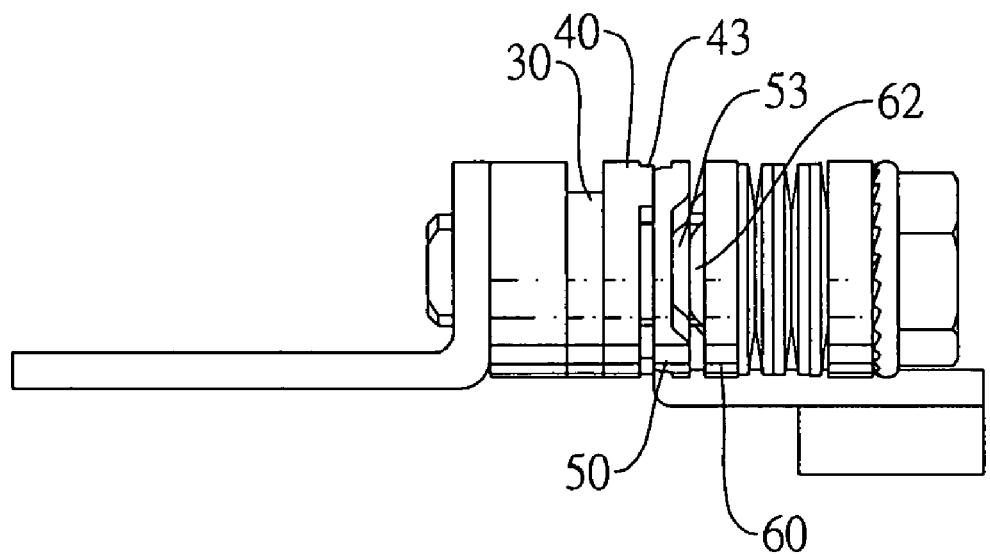
FIG. 10 is an operational side view of the limiting hinge in FIG. 1, shown turned.
Figure 11:
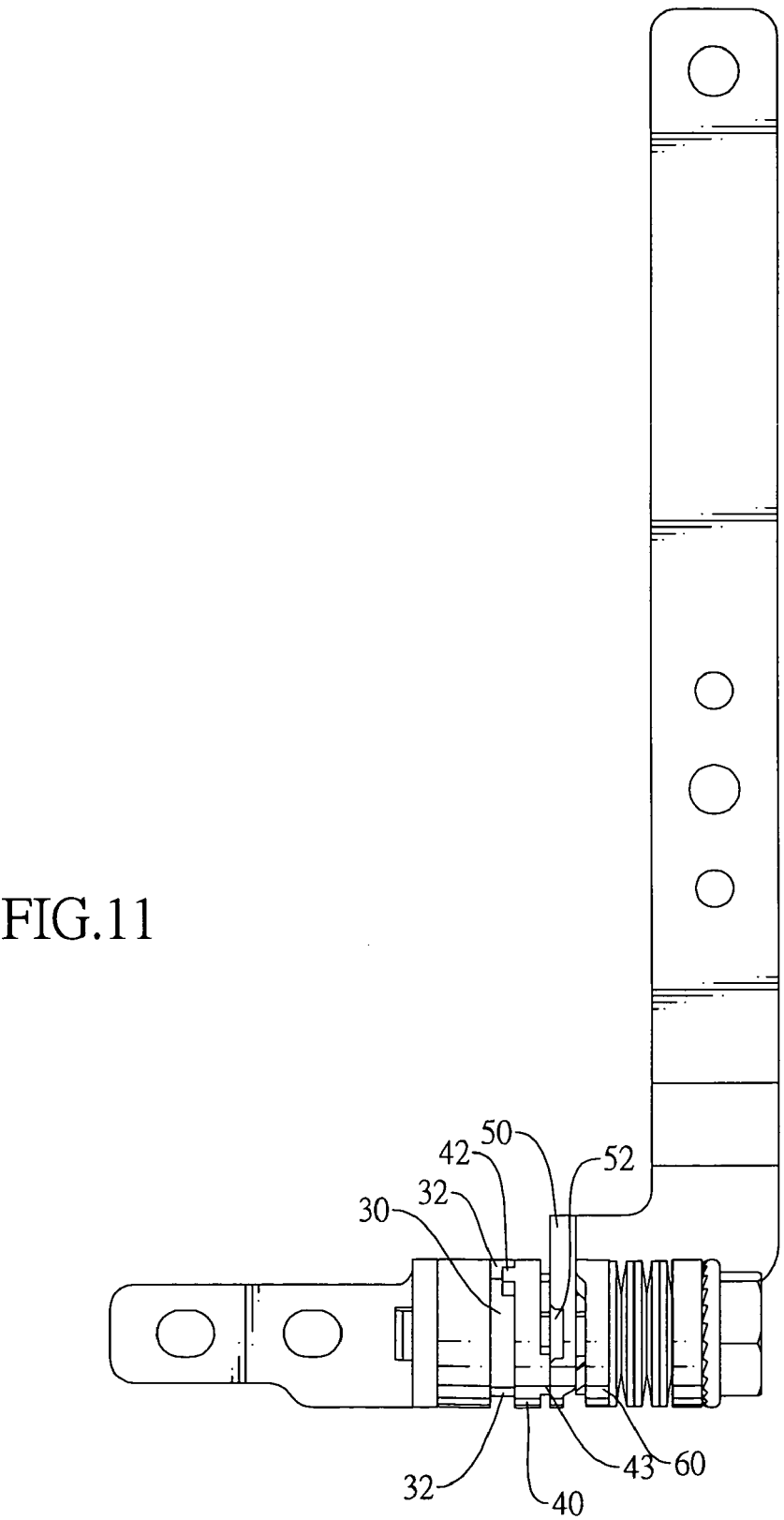
FIG. 11 is an operational top view of the limiting hinge in FIG. 1, shown turned.

With reference to FIGS. 9 to 11, the cover is over-rotated by accidental application of a huge force. Because $F_1$ is larger than $F_2$, the huge force must first overcome $F_2$. When the huge force overcomes $F_2$, the bosses (43) are forced to disengage from the recesses (52) so that the rotating limiting washer (40) is not rotated with the rotating bracket (50) and stays still with the stationary limiting washer (30). Therefore, the rotating limiting washer (40) is not over-rotated to cause damage to the limit (42) and the limiting flange (32).

The limiting hinge as described has following advantages. In the normal condition, the rotating bracket (50) rotates the rotating limiting washer (40) to provide limiting function via the abutment between the limit (42) and the limiting flange (32). In abnormal force condition, the bosses (43) disengage from the recesses (52) to stop the rotating limiting washer (40) from rotating with the rotating bracket (50) so that the limit (42) stays still to prevent breakage of the limiting flange (32).

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A limiting hinge comprising:
   a stationary bracket;
   a pintle attached securely to the stationary bracket;
   a stationary limiting washer mounted securely around the pintle and having an arced limiting flange formed transversely on and protruding from an annular edge of the stationary limiting washer and having two ends;
   a rotating limiting washer mounted rotatably around the pintle adjacent to the stationary limiting washer and having
      a limit formed longitudinally on and protruding from a first side of the rotating limiting washer and selectively abutting the ends of the limiting flange of the stationary limiting washer; and
      at least one boss formed longitudinally on and protruding from a second side of the rotating limiting washer, each of the at least one boss having two straight ends;
   a rotating bracket mounted rotatably around the pintle adjacent to the second side of the rotating limiting washer and having
      at least one recess formed longitudinally in a first side of the rotating bracket and selectively engaging the at least one boss of the rotating limiting washer; and
      at least one detent formed longitudinally in a second side of the rotating bracket, and each of the at least one detent having two inclined ends;
   a positioning washer mounted slidably around and rotated simultaneously with the pintle, disposed adjacent to the second side of the rotating bracket and having
      at least one protrusion formed longitudinally on and protruding from a first side of the positioning washer and selectively engaging the at least one detent of the rotating bracket, and each of the at least one boss having two inclined ends;
   a resilient element mounted around the pintle and abutting the positioning washer; and
   a fastener mounted securely around an end of the pintle,
   wherein when an external force is exerted to rotate the rotating bracket relative to the stationary bracket, the at least one protrusion is gradually disengaged from the at least one detent, and the rotating limiting washer is rotated simultaneously with the rotating bracket until the limit abuts the limiting flange to disengage the rotating limiting washer from the rotating bracket.

2. The limiting hinge as claimed in claim 1, wherein the rotating limiting washer has two bosses; and the rotating bracket has two recesses.

3. The limiting hinge as claimed in claim 2, wherein the rotating bracket has two detents; and the positioning washer has two protrusions.

4. The limiting hinge as claimed in claim 3, wherein
   the stationary bracket has a non-circular through hole;
   the pintle is non-circular in cross section and engages the non-circular through hole of the stationary bracket;
   the stationary limiting washer is mounted securely around the pintle via a non-circular through hole;
   the rotating limiting washer is mounted rotatably around the pintle via a circular hole;
   the rotating bracket is mounted rotatably around the pintle via a circular hole; and
   the positioning washer is rotated simultaneously with the pintle via a non-circular through hole.

5. The limiting hinge as claimed in claim 4 further comprising an additional washer mounted around the pintle and mounted between the resilient element and the fastener.

6. The limiting hinge as claimed in claim 1, wherein the rotating bracket has two detents; and the positioning washer has two protrusions.

7. The limiting hinge as claimed in claim 6, wherein the stationary bracket has a non-circular through hole; the pintle is non-circular in cross section and engages the non-circular through hole of the stationary bracket;
   the stationary limiting washer is mounted securely around the pintle via a non-circular through hole;
   the rotating limiting washer is mounted rotatably around the pintle via a circular hole;

the rotating bracket is mounted rotatably around the pintle via a circular hole; and the positioning washer is rotated simultaneously with the pintle via a non-circular through hole.

8. The limiting hinge as claimed in claim 7 further comprising an additional washer mounted around the pintle and mounted between the resilient element and the fastener.

9. A limiting hinge comprising:

a stationary bracket;

a pintle attached securely to the stationary bracket;

a stationary limiting washer mounted securely around the pintle and having an arced limiting flange formed transversely on and protruding from an annular edge of the stationary limiting washer and having two ends and a longitudinal length $L_1$;

a rotating limiting washer mounted rotatably around the pintle, being adjacent to the stationary limiting washer and having
- a limit formed longitudinally on and protruding from a first side of the rotating limiting washer and selectively abutting the ends of the limiting flange of the stationary limiting washer; and
- at least one boss formed longitudinally on and protruding from a second side of the rotating limiting washer, each of the at least one boss having two straight ends and a longitudinal length $L_2$;

a rotating bracket mounted rotatably around the pintle adjacent to the second side of the rotating limiting washer and having
- at least one recess formed longitudinally in a first side of the rotating bracket and selectively engaging the at least one boss of the rotating limiting washer; and
- at least one detent formed longitudinally in a second side of the rotating bracket, and each of the at least on detent having two inclined ends;

a positioning washer mounted slidably around and rotated simultaneously with the pintle adjacent to the second side of the rotating bracket and having at least one protrusion formed longitudinally on and protruding from a first side of the positioning washer and selectively engaging the at least one detent of the rotating bracket, and each of the at least one boss having two inclined ends and a longitudinal length $L_3$, wherein $L_3 > L_2 > L_1$;

a resilient element mounted around the pintle and abutting the positioning washer; and a fastener mounted securely around an end of the pintle.

\* \* \* \* \*